US006654223B1

(12) United States Patent
Bippus et al.

(10) Patent No.: US 6,654,223 B1
(45) Date of Patent: Nov. 25, 2003

(54) SURGE ARRESTER MOUNTING UNIT FOR TELECOMMUNICATIONS AND DATA SYSTEMS EQUIPMENT

(75) Inventors: Hans-Dieter Bippus, Holgate (AU); Bryce Lindsay Nicholls, Avoca Beach (AU)

(73) Assignee: Krone GmbH, Berlin-Zehlendorf (DE)

( * ) Notice: Subject to any disclaimer, the term of this patent is extended or adjusted under 35 U.S.C. 154(b) by 0 days.

(21) Appl. No.: 09/474,226

(22) Filed: Dec. 29, 1999

(30) Foreign Application Priority Data

Jan. 12, 1999 (DE) ........................................ 199 00 759

(51) Int. Cl.[7] .................................................. H02H 9/00

(52) U.S. Cl. ....................... 361/118; 361/119; 361/127; 439/825; 439/922

(58) Field of Search ................................. 361/118, 111, 361/91.1, 56, 127, 119; 439/825, 922

(56) References Cited

U.S. PATENT DOCUMENTS

| | | | |
|---|---|---|---|
| 4,171,857 A | 10/1979 | Forberg et al. | 339/97 P |
| 4,345,294 A | 8/1982 | Forberg et al. | 361/119 |
| 5,157,580 A | 10/1992 | Hegner et al. | 361/119 |
| 5,494,461 A * | 2/1996 | Bippus et al. | 439/709 |

FOREIGN PATENT DOCUMENTS

| | | |
|---|---|---|
| DE | 30 14 796 | 10/1981 |
| DE | 39 21 203 | 1/1991 |
| DE | 39 21 203 A1 | 1/1991 |
| DE | 43 25 952 | 2/1995 |
| GB | 1029640 | 5/1966 |

* cited by examiner

*Primary Examiner*—Stephen W. Jackson
(74) *Attorney, Agent, or Firm*—McGlew and Tuttle, P.C.

(57) ABSTRACT

A surge arrester mounting unit is provided for telecommunications and data systems technology. The arrester includes an upper part and lower part made of plastic, and metallic contact elements which are arranged in pairs and which engage, by means of spring arms, in chambers of the upper part in order to made contact with surge arresters. The contact elements have contact blades which project out of the lower part. In order to enable the surge arrester mounting unit also to be used for terminal blocks with high transmission rates, the invention provides for the contact blades (11) for separating contact fingers (directed into the interior of a terminal block) (1)), from insulation piercing contact elements (4) to be made approximately twice as long as the spring arms (19) and to be given more than double the material thickness (d) at the free end by bending over.

15 Claims, 3 Drawing Sheets

FIG.6
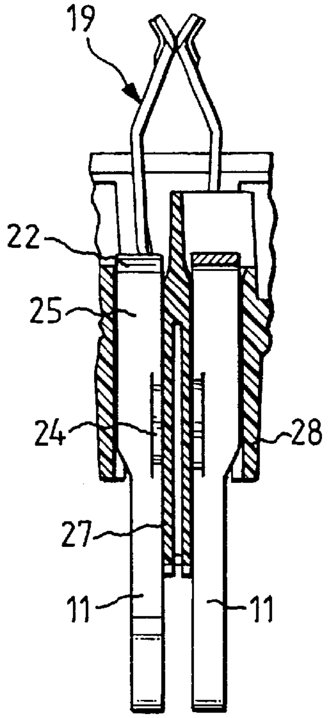
FIG.7
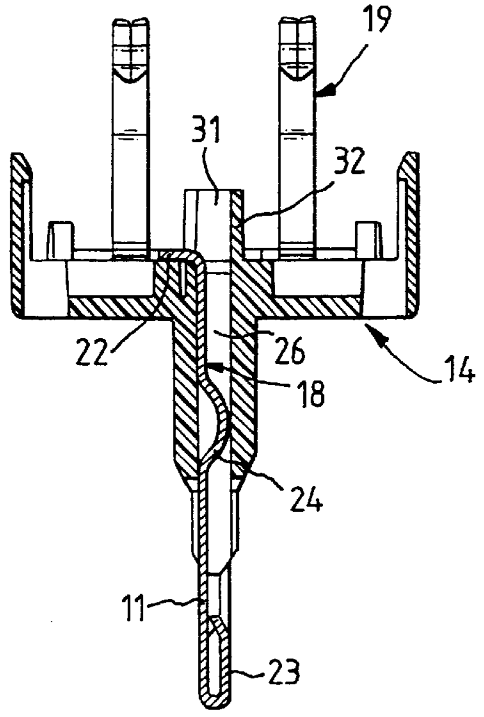
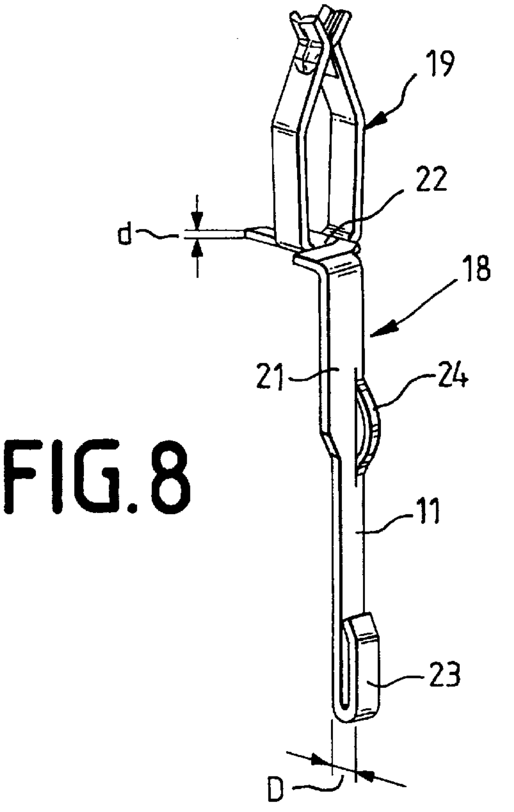
FIG.8

SURGE ARRESTER MOUNTING UNIT FOR TELECOMMUNICATIONS AND DATA SYSTEMS EQUIPMENT

FIELD OF THE INVENTION

The invention relates to an surge arrester mounting unit for telecommunications and data systems equipment, composed of an upper part and a lower part made of plastic, and of metallic contact elements which are arranged in pairs and which each engage by means of spring arms in chambers of the upper part in order to make contact with surge arresters, and project out of the lower part as contact blades.

BACKGROUND OF THE INVENTION

An surge arrester mounting unit of the generic type has previously been disclosed in DE 3014796 C3. In this mounting unit, the contact blades which project out of the lower part are designed to engage in contact springs of a terminal block whose design has previously been disclosed in DE 2725551 C2. Here, in each case two insulation piercing contact elements form, together with a contact spring, a single component, the contact spring being located relatively close to the top of the terminal block so that the contact blades can engage in it.

In addition, DE 4325952 C2 has previously disclosed terminal blocks for telecommunications and data systems equipment with high transmission rates, in which terminal blocks there are, between the insulation piercing contact elements, contact fingers which are directed into the interior of the terminal block and which can be separated by a printed circuit board-like plug tongue of a plug. Over voltage protection for such a terminal block for high transmission rates cannot be provided by plugging in the surge arrester mounting unit which has previously been disclosed in DE 3014796 C3, since the contact blades of the mounting unit cannot separate the contact fingers of such a terminal block for high transmission rates.

SUMMARY AND OBJECTS OF THE INVENTION

The invention is therefore based on the object of developing the surge arrester mounting unit of the generic type in such a way that the latter can also be used for over voltage protection of terminal blocks for high transmission rates.

In order to achieve this object, the invention provides for the contact blades for separating contact fingers (directed into the interior of a terminal block) from insulation piercing contact elements, to be made approximately twice as long as the spring arms and to be given more than double the material thickness at the free end by bending over. This significant, lengthening of the contact blades and the considerable thickening of the contact blades gives them the function of a printed circuit board-like plug which can engage between the contact fingers directed into the interior of the terminal block and separate them while making contact, so that over voltage protection is ensured for the terminal block for high transmission rates. The combination of lengthening and thickening of the contact blades is essential here, since it is the only way of being sure of both making contact with, and also separating, the contact fingers, directed into the interior of the terminal block, of the insulation piercing contact elements.

In order to stabilize the contact blades and secure their position, the contact blades have a bowed portion cut out of the material approximately in the longitudinal center.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 6 is a sectional view taken along the line VI—VI in FIG. 5 with contact elements;

FIG. 7 is a cross sectional view taken through the lower part with contact elements; and FIG. 8 is a perspective side view of a contact element.

DESCRIPTION OF THE PREFERRED EMBODIMENT

Figure 1:
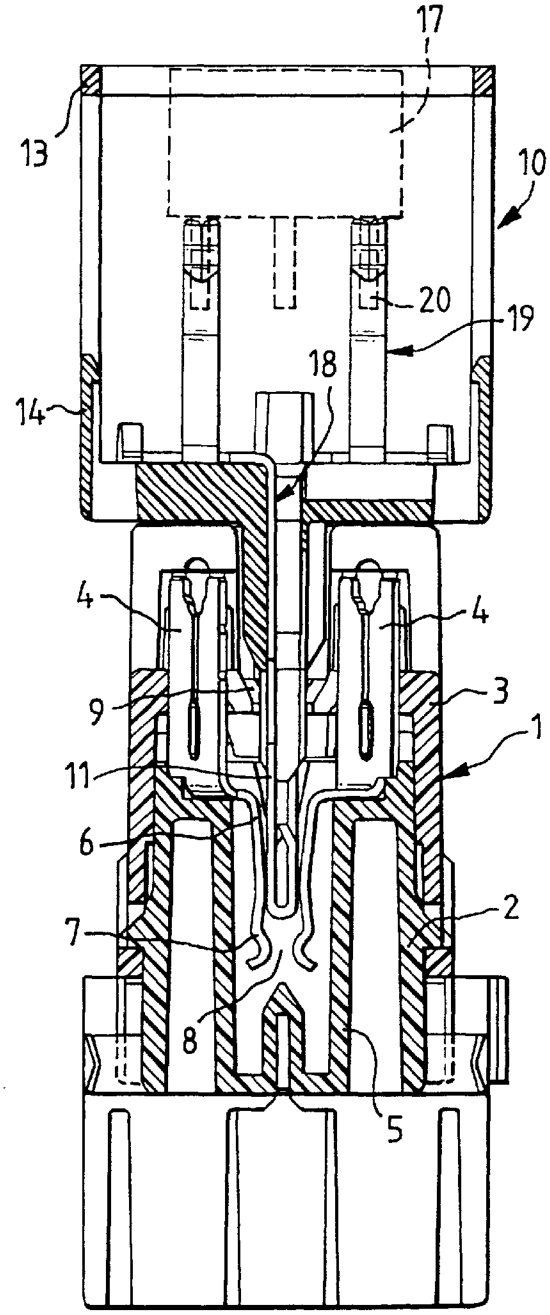
FIG. 1 is a vertical cross sectional view through the surge arrester mounting unit which has been plugged into a terminal block.
Figure 2:
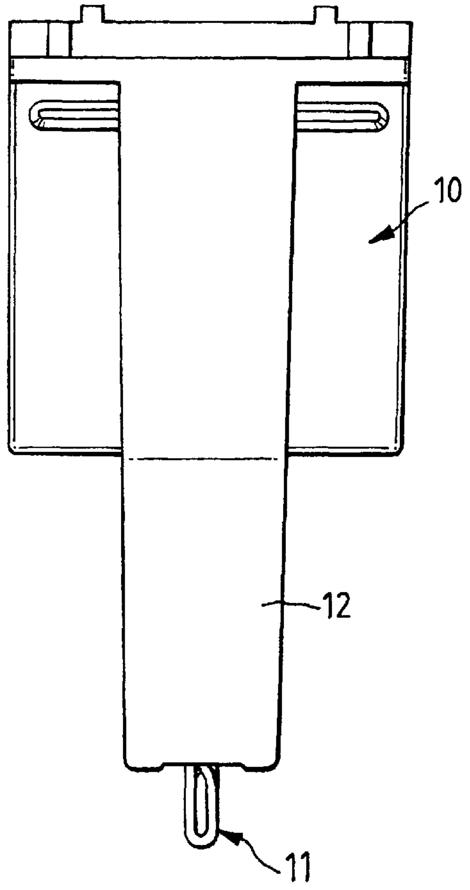
FIG. 2 is an end view of the surge arrester 10 mounting unit.
Figure 3:
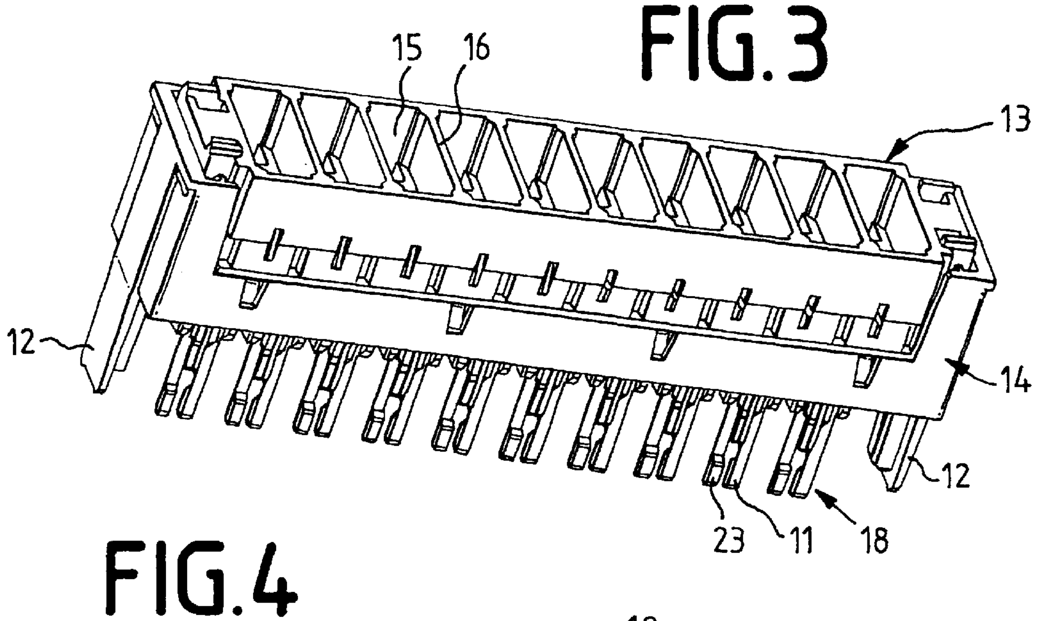
FIG. 3 is a perspective view of the surge arrester mounting unit.

Referring to the drawings in particular, the lower part of FIG. 1 shows a vertical cross section through a terminal block 1 for telecommunications and data systems equipment with high transmission rates, in accordance with DE 4325952 C2. The terminal block 1 is composed of a housing lower part 2 and a housing upper part 3, each made of plastic, into which two rows of short insulation piercing contact elements 4 for connecting cable conductors are inserted. The distance between two adjacent pairs of insulation piercing contact elements 4 is (in a manner not illustrated in more detail) greater than the distance between two adjacent insulation piercing contact elements of a pair. The insulation piercing contact elements 4 are supported on supporting walls 5 in the housing lower part 2 and are lengthened, with obliquely angled contact fingers 6. The fingers 6 are directed into the interior of the terminal block 1. Spring contacts 7 are provided which adjoin the finger 6. The opposing fingers 6 and opposing contacts 7 form a break point 8 between them. Between the two rows of insulation piercing contact elements 4, the connection block 1 has a row of plug-in openings 9 for contact blades 11 of an surge arrester mounting unit 10. These openings 9 provide the access to separate the contact connection between the spring contacts 7.

The surge arrester mounting unit 10 is illustrated in more detail in FIGS. 2 to 7. The mounting unit 10 has, on its two ends, clip-like prolongations 12 which are made of plastic. The clip-like prolongations 12 serve, in a fashion which is not illustrated in more detail, to make a connection to the housing upper part 3 of the terminal block 1 and over which the free ends of the contact blades 11 project. The surge arrester mounting unit 10 for telecommunications and data systems equipment is composed of an upper part 13 and a lower part 14, each made of plastic. The upper part 13 is latched into the lower part 14 by means of latching connections. In the upper part 13 there are ten chambers 15, divided by transverse walls 16, for the insertion of surge arresters 17 (FIG. 1). Each chamber 15 is assigned a pair of metallic contact elements 18 (FIG. 8) which are composed of spring arms 19, projecting into the chambers 15, for making contact with the connection limbs 20 of the surge arresters 17, and of a contact blade 11 projecting out of the lower part 14. The spring arms 19 are joined, in each case in pairs, to a web 22 and bent at the free end into a V shape and are directed towards one another. The contact blade 11 projects from the web 22 with a rounded portion and at approximately 90°, and it is approximately twice as long as the spring arms 19, and is thickened at its free end to a thickness D of more than twice the material thickness d of the contact blade 21 by bending an end clip 23. Each metallic contact element 18 is formed in one piece with its spring arms 19, which are arranged in pairs, its contact blade 11 and its bent-over end clip 23. Provided approximately in the longitudinal center of the contact blade 21, underneath a shoulder 21, there is a domed section 24 in the form of a curve. This domed section 24 is cut out of the material of the contact blade 11, is curved out above the planar shoulder 21 and serves to take up the play of the contact blade 11 which is inserted into the lower part 14. Due to the thickened end clip 23, the contact blade 11 requires a through opening 26 through the base 29 of the lower part 14, which has a greater cross section, as will be explained below.

Figure 4:
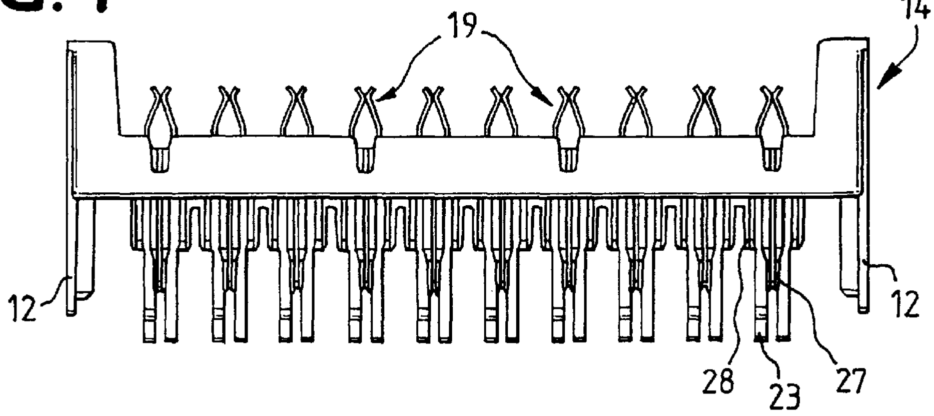
FIG. 4 is a side view of the lower part of the surge arrester mounting unit with contact elements.
Figure 5:
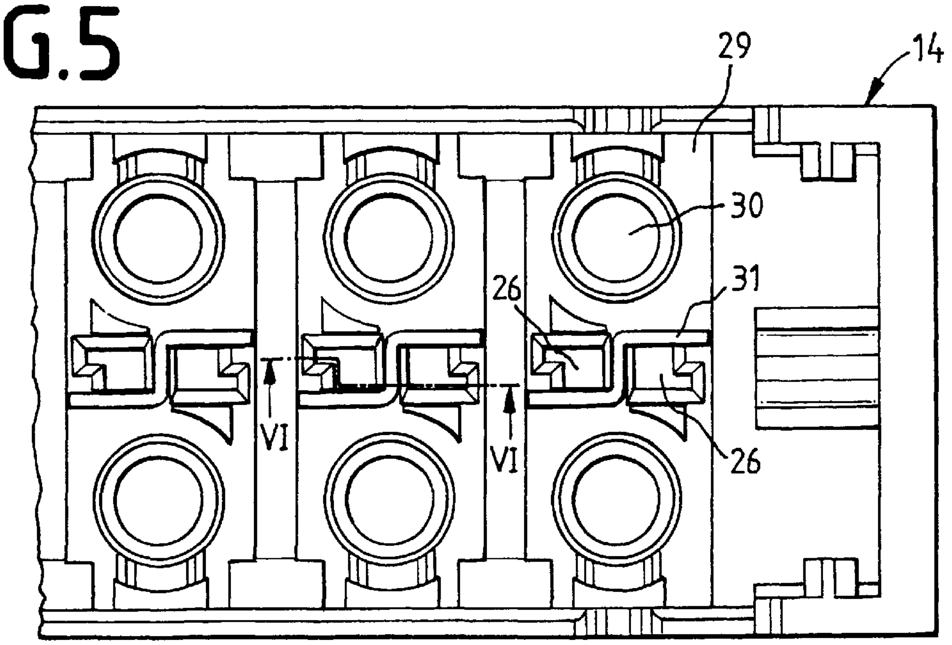
FIG. 5 is an enlarged plan view of a lower part according to FIG. 4 without contact elements.

As FIG. 4 shows, the spring arms 19 which are arranged in pairs project into the free space of the lower part 14 into which the upper part 13 is inserted. The spring arms 19 each engage in pairs in the chambers 15 of the upper part 13. The contact blades 11 are of longer design and have the thickened end clip 23 project out of the lower part 14 parallel to the lateral clips 12 and are each plugged into the base 29 of the lower part 14, after having been respectively rotated through 180°. The result is that the thickened end clips 23 of the contact blade 11 are pointed in alternating directions with respect to the two longitudinal sides of the lower part 14. As is clear from FIG. 7, the metallic contact elements 18 are plugged into the lower part 14, with their webs 22 parallel to the base of the lower part 14. The contact blades 11 penetrate the openings 23 in the base of the lower part 14, the cross section of which openings 26 is L-shaped (FIG. 5) and is matched to the thickened end clip 23.

On the underside of the lower part 14 there are central guide webs 27 between the laterally adjacent clips 12, the guide webs 27 being made of plastic and each guiding a pair of contact blades 11. Between in each case two pairs of contact blades 11 there are central webs 28 which are made of plastic and which additionally guide the contact blades 11. The cut-out curved section 24 of each contact blade 11 is located here in a guide duct 33 which is formed from the guide webs 27 and the central webs 28, in such a way that the contact blade 11 is securely mounted in the lower part 14 despite the fact that the opening 26 is larger in cross section. The base 29 of the lower part 14 has two large openings 13 per pair of contact blades 11. A Z shaped wall 31 is provided between the openings 30 so that the thickened end clips 23 of the contact blades 11 can pass through openings 26, which are L-shaped in cross section, on each side of the limbs 23 of the wall 31. The bowed sections 24 are provided to secure the position, and to absorb the play, of the contact blade 11 in the guide duct 33 adjoining the opening 26.

While specific embodiments of the invention have been shown and described in detail to illustrate the application of the principles of the invention, it will be understood that the invention may be embodied otherwise without departing from such principles.

What is claimed is:

1. A surge arrester mounting unit for telecommunications and data systems equipment, the mounting unit comprising:

an upper part made of plastic;

a lower part made of plastic;

metallic contact elements arranged in pairs in chambers of the upper part, each contact element having a spring arms with contact element pairs engaging by means of said spring arms for making contact with a surge arrester, said contact elements projecting out of said lower part as contact blades, said contact blades for separating contact fingers of insulation piercing contact elements, upon being directed into the interior of a terminal block, said contact blades being approximately twice as long as said spring arms and having a bent over portion providing more than double a material thickness at a free end of said contact blades.

2. The surge arrester mounting unit as claimed in claim 1, wherein said contact blades have, approximately in the longitudinal center, a bowed portion which is cut out of the material.

3. The surge arrester mounting unit as claimed in claim 2, wherein said lower part has a base with an opening with an L-shaped cross section providing an access space for the bent over portion of a respective contact blade to pass through and having a guide duct with a bowed portion for guiding the contact blade by means of an adjoin opening.

4. A surge arrester mounting unit as claimed in claim 1, wherein said contact blades are positioned for insulation piercing contact elements of the terminal block having contact pairs with a distance between two adjacent pairs of insulation piercing contact elements being larger than the distance between two adjacent insulation piercing contact elements of a pair.

5. A surge arrester mounting unit as claimed in claim 4, wherein said contact blades are positioned for the terminal block being provided with a central row of plug-in openings for the contact blades.

6. A surge arrester and terminal block combination, comprising:

a to block having an interior with insulation piercing contact elements each a contact fingers with cooperating contact fingers being biased into contact; and a surge arrester mounting unit with an upper part made of plastic, a lower part made of plastic and metallic contact elements arranged in pairs in chambers of the upper part, each of said contact elements having a spring arm portion with contact element pairs engaging for making contact with a surge arrester, said contact elements each having a portion projecting out of said lower part as contact blade each of said contact blades for separating contact fingers of insulation piercing contact elements, upon being directed into the interior of a terminal block, each of said contact blades being approximately twice as long as said spring arms and having a bent over portion providing more than double a material thickness at a free end of said contact blades.

7. A combination as claimed in claim 6, wherein said contact blades have, approximately in the longitudinal center, a bowed portion which is cut out of the material.

8. A combination as claimed in claim 7, wherein said lower part has a base with an opening with an L-shaped cross section providing an access space for the bent over portion of a respective contact blade to pass through and having a guide duct with a bowed portion for guiding the contact blade by means of an adjoining opening.

9. A combination as claimed in claim 6, wherein said contact blades are positioned for interaction with said insulation piercing contact elements of said terminal block, said insulation piercing contact elements being provided forming contact pairs with a distance between two adjacent pairs of insulation piercing contact elements being larger than a distance between two adjacent insulation piercing contact elements of a pair.

10. A surge arrester mounting unit as claimed in claim 9, wherein said terminal block has a central row of plug-in openings for said contact blades.

11. A surge arrester mounting unit comprising:

an upper part made of plastic;

a lower part made of plastic;

surge arresters;

a set of first metallic contact elements; and a set of second metallic contact elements, the first and second contact elements being arranged in pairs in the upper part, each of the first and second contact elements being an integral structure having spring arms with respective egg contact element pairs for making contact with one of said surge arresters, said contact elements each including an integral portion projecting out of said lower part as contact blades for separating contact fingers of insulation piercing contact elements, upon being directed into the interior of a terminal block, said contact blades being approximately twice as long as said spring arms and having a bent over portion providing more than double a material thickness at a free end contact part of each of said contact blades.

12. A surge arrester mounting unit as claimed in claim 11, wherein said contact blades have, approximately in a longitudinal center, a bowed portion which is cut out of the material.

13. A surge arrester mounting unit as claimed in claim 12, wherein said lower part has a base with an opening with an L-shaped cross section providing an access space for the bent over portion of a respective cob blade to pass Trough and having a guide duct with a bowed portion for guiding the contact blade by means of an adjoining opening.

14. A surge arrester mounting unit as claimed in claim 11, wherein said contact blades are positioned spaced apart for interaction with said insulation piercing contact elements of said terminal block, said insulation piercing contact elements being provided forming contact pairs with a distance between two adjacent pairs of insulation piercing contact elements being larger than a distance between two adjacent insulation piercing contact elements of a pair.

15. A surge arrester mounting unit as claimed in claim 14, wherein said terminal block has a central row of plug-in openings for said contact blades.

* * * * *